Nov. 21, 1950  I. W. DOYLE  2,531,034
COMPOUND BLADE SYMMETRICAL OPENING CAMERA SHUTTER
Filed Aug. 21, 1947
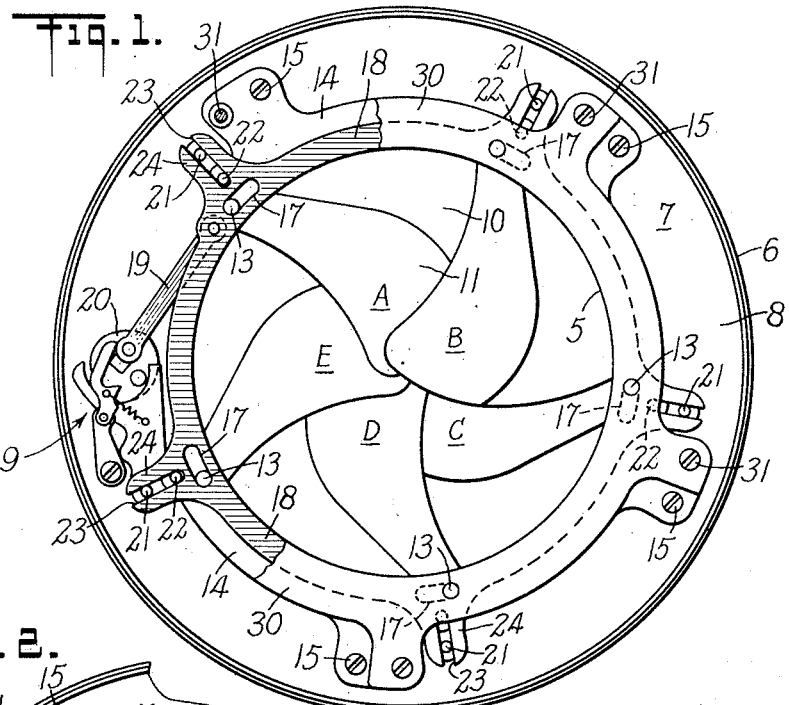
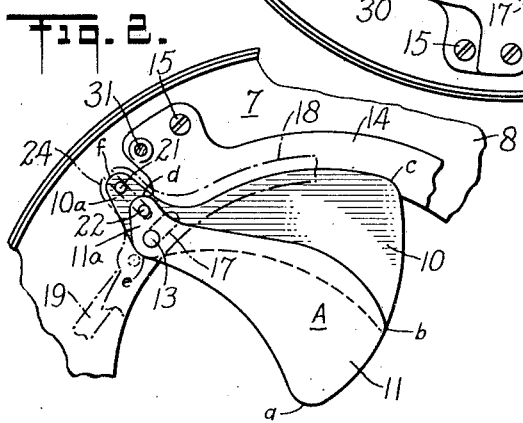
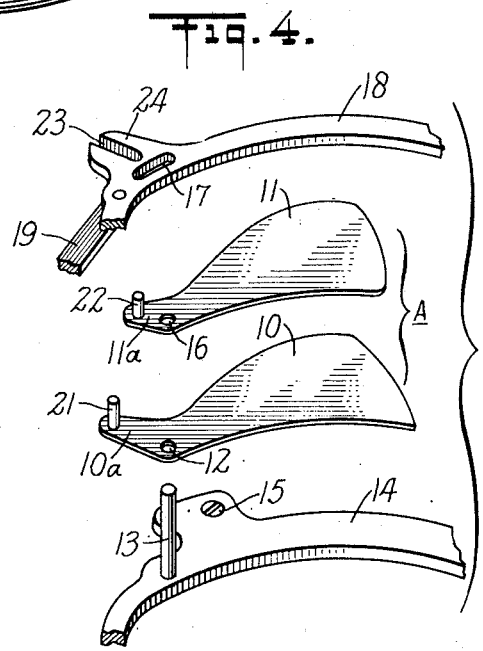
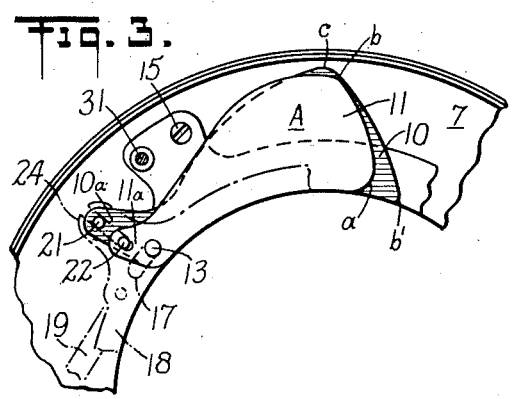
INVENTOR
*Irving W. Doyle*
BY
*Blair, Curtis + Hayward*
ATTORNEYS Patented Nov. 21, 1950

2,531,034

UNITED STATES PATENT OFFICE 2,531,034

COMPOUND BLADE SYMMETRICAL OPENING CAMERA SHUTTER

Irving W. Doyle, Massapequa, N. Y., assignor to Fairchild Camera and Instrument Corporation, Jamaica, N. Y.

Application August 21, 1947, Serial No. 769,884

1 Claim. (Cl. 95—63)

This invention relates to photographic shutters, and more particularly to a compound blade shutter of the more massive type such as are used, for example, in large aerial cameras.

Certain types of cameras, e. g. aerial cameras, are designed with exposure areas of the order of 160 square inches or more, which necessitates lens and shutter units of proportionately large aperture. Thus such a camera may include a multiple blade shutter having an aperture whose diameter exceeds six inches. With a shutter of such size, the shutter blades have substantial mass, necessitating powerful and rugged driving mechanism if shutter speed and efficiency is to be established and maintained at a high value. While it is, of course, possible to design such operating mechanism, it, together with the shutter blades, is so bulky as to necessitate a housing of substantial size to surround the operating mechanism and accommodate the shutter blades when opened. This results in a unit of very considerable outside diameter and weight. Space and weight are, of course, factors of primary consideration in aerial camera shutters as well as other types and are desirably kept to minimum values.

Even where the shutter blade driving mechanism is sufficiently powerful and rugged to drive the blades at desired shutter speeds, high shutter efficiency cannot always be obtained, i. e. the time the shutter is fully opened during an operating cycle may be so low as to reduce shutter efficiency to an unusable low value. This results by virtue of the size and necessarily rugged and heavy construction of the conventional shutter blade which has such mass and inertia as to create acceleration and momentum difficulties where the shutter is large.

A conventional shutter blade, such as is normally used in a three or five blade shutter, is roughly triangular in shape, being narrow in the region of its pivot and of substantial width at its high velocity outer edge. In a large shutter, and indeed in small shutters, such blades must be relatively thick and rigid to preclude an excess of flutter when moving at high velocities. If the shutter blade is too thin, it will flutter excessively with resultant possible damage.

It is accordingly among the objects of this invention to provide a shutter which is of simple and rugged construction, which will operate at high efficiency, and which effectively overcomes the aforementioned difficulties. Other objects will be in part apparent and in part pointed out hereinafter.

In accordance with one form of my invention, the shutter includes driving mechanism of conventional type, which is housed within an annular chamber encircling the shutter aperture. This mechanism may drive a blade driving ring to which each of the shutter blades, five, for example, is connected. According to my invention, each of these shutter blades is a compound assembly comprising two or more individual members whose adjacent edges overlap slightly when the shutter is closed, the individual blades, of course, overlapping adjacent blades in each direction around the perimeter of the shutter, as in the conventional design. Thus when the shutter is tripped, the inner member of the compound blade moves as far as a conventional blade, but is only about one-half as heavy. The outer member of the compound blade moves only one-half as far as a conventional blade, and is only about one-half as heavy. Thus the outer member moves about one-half as fast as the conventional blade, and the force and acceleration factors are accordingly considerably lower.

In the drawing, wherein I have shown one form of my invention,

Figure 1 is an elevation of a shutter incorporating my compound shutter blades, the blades being shown closed;

Figure 2 is a fragmentary elevation of a single compound blade showing the blade members in closed position;

Figure 3 is a view similar to Figure 2, but showing the blade members in open position; and, Figure 4 is an exploded fragmentary perspective view of the blade support, the blade members and the driving ring therefor.

Similar reference characters refer to similar parts throughout the views of the drawing.

Referring now to Figure 1, the shutter, in general, comprises inner and outer concentric walls 5 and 6, forming an annular chamber 7, one side of which is closed by a back plate 8, the other side being closed by a removable front plate (not shown). In this channel is disposed the shutter blade driving mechanism, generally indicated at 9, by which the blade driving ring described hereinafter is driven to actuate the blades between open and closed positions. These blades are generally designated A, B, C, D and E, and move between the closed and open positions shown respectively in Figures 2 and 3, under the driving impetus of mechanism 9, when the shutter is tripped. It might here be noted that the shutter driving or operating mechanism may be of the nature of that shown in Doyle et al. 2,399,476.

Each of blades A–E is a compound blade. Thus, for example, blade A (Figure 4) comprises blade members 10 and 11. Blade member 10 is the outer member and has a hole 12 formed therein through which a pivot pin 13 extends to pivotally mount the blade member. This pin 13 is secured to and extends from a supporting ring 14 which may be fastened as by screws 15 to back plate 8 of the shutter housing.

Inner blade member 11 also has a hole 16, by which this member is pivotally mounted on pin 13, the upper end of the pin extending through an elongated slot 17 formed in a blade driving ring 18, which is suitably supported in the shutter housing in driving relation to the several blade members. A covering ring 30 (Figure 1) is fastened to back plate 8 as by screws 31 in spaced relation to supporting ring 14, rings 14 and 30 thus holding the blade members and driving ring in assembled relation.

Driving ring 18 is connected as by a link 19 (see Figure 1) to a driving disc 20 which forms a part of operating mechanism 9. When the shutter is tripped, disc 20 rotates one complete revolution and accordingly oscillates ring 18 from its Figure 2 position to its Figure 3 position and then back again. In so doing, blades A–E are opened and closed in a manner that will now be described.

Blade member 10 (Figures 1 and 4) includes a tab 10a to which a driving pin 21 is secured. Blade member 11 also includes a tab 11a which carries a driving pin 22. As is better shown in Figure 1, these pins 21 and 22 are received in an elongated open-ended slot 23 formed in a finger 24 or the like, which is preferably integral with and extends from driving ring 18 (see Figure 4).

As shown in Figures 2 and 3, tab 11a of inner member 11 is considerably shorter than tab 10a of blade member 10, driving pin 22 accordingly being much closer to the pivotal axis, i. e. the axis of pin 13, than is driving pin 21. Accordingly, when driving ring 18 is driven counterclockwise to open the shutter, a greater amount of angular motion is imparted to inner blade member 11 than to the outer blade member 10. Thus while both blade members start to move at the same time, member 11 moves faster and farther than member 10. Member 11 accordingly catches up with member 10 when the shutter is in its open (Figure 3) position, wherein driving ring 18 is at one limit of its oscillatory movement. By the same token, when the driving ring is driven clockwise to close the shutter, blade member 11 moves faster and approximately twice as far as blade member 10 in returning to the Figure 2, or closed position.

With reference to Figure 2, and assuming that blade A is of the unitary conventional type, the blade is bounded by a, b, c, d, e, a. It will clearly appear that if blade A were of the unitary type, annular chamber 7 would have to be approximately twice its illustrated width to accommodate the blade when swung to open position, thus materially increasing the outside diameter of the shutter unit and accordingly substantially increasing its weight and bulkiness. By compounding each shutter blade, each of such blades, e. g. blade A, is broken up into illustratively the two members 10 and 11. Thus the inner member 11 is bounded by a, b, d, e, a, while the outer member 10 is bounded by b, c, f, e, b. The two blade members must, of course, overlap slightly, as indicated, to attain a light-tight relation when the shutter is closed.

Thus when the shutter opens, the edge a, b of inner member 11 moves to the position shown in Figure 3, while the edge b, c of outer blade member 10 moves to the position b', c. This, of course, means that the inner member 11 moves as far as a conventional shutter blade, but as it is only about one-half the size of such blade, and accordingly proportionately lighter, does not necessitate the same amount of driving force, and accelerates more rapidly. Also, by virtue of its relatively light weight, the value of its momentum is not excessive and accordingly excessive shock and rebound at the end of the opening stroke are avoided. The outer blade member 10 moves only about one-half as far as a conventional blade, and is only about one-half as heavy. Therefore, the outer blade member has to move only one-half as fast, and the force and acceleration are very considerably lower. As noted before, the breaking up of the conventional blade in the manner shown makes it possible to reduce the outside diameter of the shutter unit materially. This diameter can be still further reduced if it is desired to break up the blade into more than two members.

Thus it follows that the force to actuate the compound blade, i. e. to drive the individual blade members, can be very materially lower for a given speed, or, conversely, for a given force when that is the limitation, the speed can be higher since the effective mass to be accelerated is lower. Then too, since the compound blade members are considerably narrower at their outer high velocity edges than a conventional blade, the compound members are accordingly substantially stiffer and give less trouble from flutter.

Comparing a shutter of conventional construction with my shutter, in any one shutter operation, the aforesaid advantages are borne out by the following mathematical analyses:

M = Mass of single large blade
θ = Angular travel of single large blade
k = Radius of gyration of either single large blade, or of either of the two small blade members
$T_1$ = Torque applied to single large blade
$T_2$ = Total torque applied to two small blade members
$T_{2a}$ = Torque applied to small blade member 11
$T_{2b}$ = Torque applied to small blade member 10
$I_1$ = Moment of inertia of single large blade
$I_2$ = Moment of inertia of two small blade members Then it is obvious $$T_2 = T_{2a} + T_{2b}$$

In any one shutter operation, if the shutter speed or exposure time and efficiency is to be the same for both types, it is obvious that the time for getting the blades open (or for getting them closed) must be the same for both types. This time may be designated $T_0$ (opening time).

For a minimum acceleration under these conditions, one half of this time the blades will be accelerating at uniform acceleration, and the other half of this time they will be decelerating. This also means that for one half of the angular travel of the blades they will be accelerating and the other half they will be decelerating.

In the case of the large blades:

$$T_1 = I_1 \alpha_1$$
$$I_1 = Mk^2$$
$$\frac{\theta}{2} = \frac{1}{2}\alpha_1 \left(\frac{T_0}{2}\right)^2 = \frac{1}{2}\alpha_1 \frac{T_0^2}{4} = \frac{1}{8}\alpha_1 T_0^2$$

or $$\alpha_1 = 8 \cdot \frac{\theta}{2} \cdot \frac{1}{T_0^2} = \frac{4\theta}{T_0^2}$$

Substituting $$T_1 = Mk^2 \frac{4\theta}{T_0^2} = 4\frac{Mk^2\theta}{T_0^2}$$

In the case of the two small blade members:

$$T_{2a} = I_{2a} \alpha_{2a}$$
$$I_{2a} = \frac{Mk^2}{2}$$
$$\frac{\theta}{2} = \frac{1}{2}\alpha_{2a}\left(\frac{T_0}{2}\right)^2$$

or solving for $\alpha_{2a}$, $$\alpha_{2a} = \frac{4\theta}{T_0^2}$$
$$\therefore T_{2a} = \frac{Mk^2}{2} \cdot \frac{4}{T_0^2} = 2\frac{Mk^2}{T_0^2}$$

also:

$$T_{2b} = I_{2b} \alpha_{2b}$$
$$I_{2b} = \frac{Mk^2}{2}$$
$$\frac{\theta}{4} = \frac{1}{2}\alpha_{2b}\left(\frac{T_0}{2}\right)^2$$

or $$\alpha_{2b} = \frac{2\theta}{T_0^2}$$
$$\therefore T_{2b} = \frac{Mk^2}{2} \cdot \frac{2\theta}{T_0^2} = \frac{Mk^2\theta}{T_0^2}$$

and $$T_{2a} + T_{2b} = T_2 = 2\frac{Mk^2\theta}{T_0^2} + \frac{Mk^2\theta}{T_0^2} = 3\frac{Mk^2\theta}{T_0^2}$$

Then the ratio of $T_1$ to $T_2 =$ $$\frac{4\dfrac{Mk^2\theta}{T_0^2}}{3\dfrac{Mk^2\theta}{T_0^2}} = \frac{4}{3}$$

This indicates that only three-quarters as much torque is required for the compound blade design as for the single blade design.

It may thus be seen that I have attained the several objects of the invention in a thoroughly practical and efficient manner.

I claim:

A photographic shutter comprising in combination, a housing having an aperture formed therein and a chamber surrounding said aperture, a supporting ring fastened to said housing and encircling said aperture, a plurality of shutter blade pivot pins secured to and extending from said supporting ring, a shutter blade pivotally mounted on each of said pins and movable between open and closed positions relative to said aperture, each of said blades comprising at least two members which partially overlap one another when the shutter is closed and which are substantially superposed when the shutter is open, said blade members having crank arms of different length, a drive pin secured to the end of each of said crank arms, a drive ring for said shutter blades, said drive ring having an elongated slot for each of said pivot pins, said drive ring also having a slotted radially extended finger to receive each set of blade member drive pins, and a cover ring secured to said housing from said drive ring, said cover ring having holes formed therein through which said pivot pins extend respectively.

IRVING W. DOYLE.

REFERENCES CITED

The following references are of record in the file of this patent:

UNITED STATES PATENTS

| Number | Name | Date |
|---|---|---|
| 1,483,465 | Marks | Feb. 12, 1924 |
| 2,382,623 | Fuerst | Aug. 14, 1945 |

FOREIGN PATENTS

| Number | Country | Date |
|---|---|---|
| 155,213 | Great Britain | Mar. 10, 1922 |
| 585,691 | Great Britain | Feb. 19, 1947 |